J. Baird,
Steam-Engine Piston.
N° 39,458.   Patented Aug. 11, 1863.
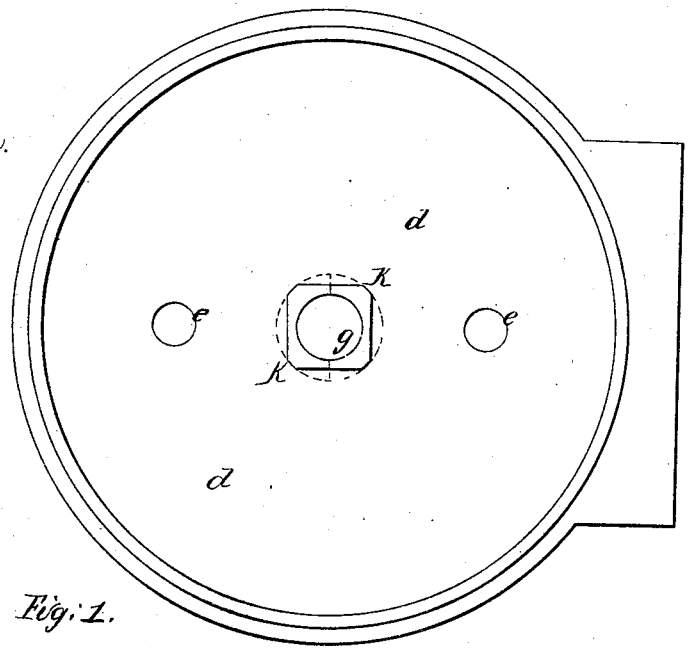
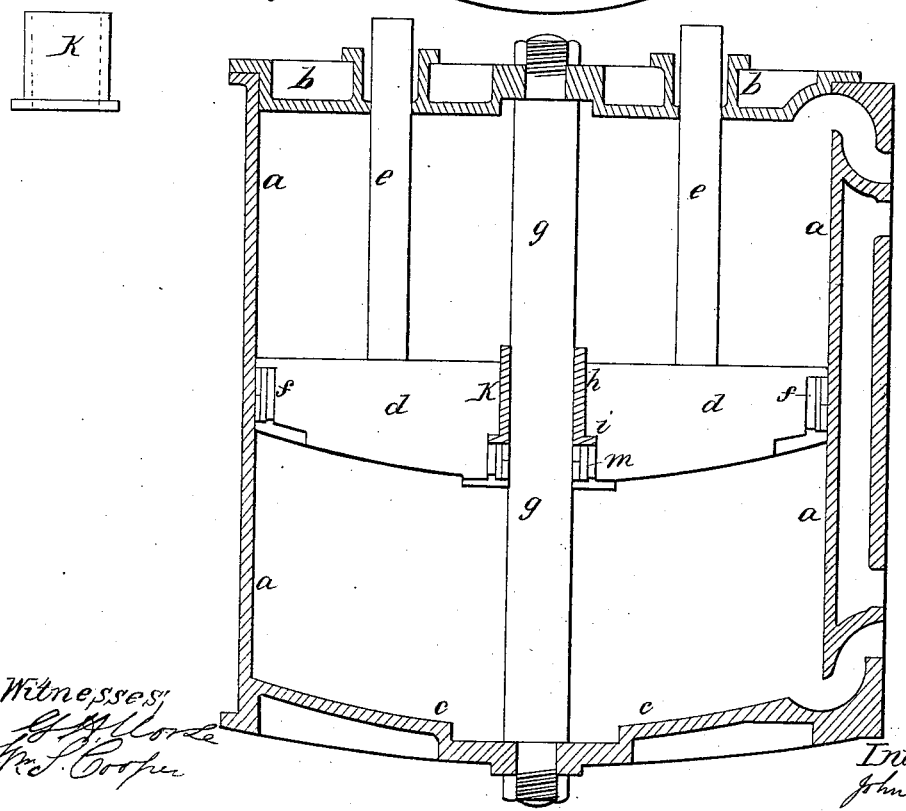
Witnesses:    Inventor,

UNITED STATES PATENT OFFICE.

JOHN BAIRD, OF NEW YORK, N. Y.

IMPROVEMENT IN STEAM-ENGINES.

Specification forming part of Letters Patent No. 39,458, dated August 11, 1863.

*To all whom it may concern:*

Be it known that I, JOHN BAIRD, mechanical engineer, of the city, county, and State of New York, have invented certain new and useful Improvements in Steam-Engines; and I do hereby declare that the following, taken in connection with the drawings, is a full, clear, and exact description thereof.

In the drawings, Figure 1 is a section through a cylinder of a steam-engine exhibiting my improvements. Fig. 2 is an end view of the same with the cover removed, and Fig. 3 is a representation in plan and elevation of a bush or sliding block.

My present invention has for its object the prevention of the unequal wear or cutting of cylinders owing to greater pressure of the piston on certain parts of the bore than on other parts; and the invention is chiefly applicable to horizontal or inclined engines, where the weight of the piston, or a part thereof, lies on the lower side of the bore, but is also applicable to oscillating engines, and in the preferred form in which I apply my invention the use thereof enables me to use lighter ends for the cylinder, and at the same time preserve the same or even greater strength.

The cutting or unequal wear of horizontal or inclined cylinders of large size, owing to the inside or bore of the cylinder carrying the whole or part of the weight of the piston, is a fact well known to practical engineers, and the evils arising therefrom are equally well known. So also is the unequal wear of the cylinders of oscillators, arising from the fact that in the generality of such engines the cylinder is oscillated by the bearing of the packing, or the piston, or both, against the bore, and that the piston swings from one side to the other as the cranks pass the half centers, and as these evils are well known, I do not intend to enlarge upon them. My invention remedies these evils, preventing such unequal wear or cutting in horizontal or inclined engines by supporting the weight of the piston upon a rod or rods passing through the piston from one end of the cylinder to the other, and performing the same duty in oscillators by transferring the pressure necessary to oscillate the cylinder from its side to such a rod or rods.

In the drawings, a cylinder of an engine is represented at $a\ a\ a$, the cover at $b\ b$, the end or bottom at $c\ c$, a piston at $d\ d$, and two piston-rods at $e\ e$, with follower and packing at $f\ f$. The rods and follower are to be secured in any usual or proper manner, and the packing may be of any variety. The piston has a hole through it at its center, and passing through this hole is a stationary rod, $g$, which passes through both heads and is secured thereto by nuts. I prefer to make the hole for a part of its length polygonal—say, from $h$ to $i$—and for the rest of its length cylindrical. Into the polygonal hole I insert a bush or sliding block, $k$, made in two pieces, and having at one end a cylindrical flange, and bored out to the size of the rod. Around the rod, between the flange and the surface of the piston, I insert packing, and hold the same in place by a gland or follower, the arrangement being represented at $m$. Any stuffing-box packing or packing proper for the interior packing of annular-cylinder engines will answer the purpose. The office of the bush is to bear the weight of the piston, transferring it to the rod, and the packing is to prevent steam from passing by the piston; and I prefer a bush, instead of a simple hole through the cylinder, because the former may be set up after wear by liners, keys, or set-screws. I make the bush polygonal in order to prevent its turning. A mere inspection of the drawings will show that the rod will take the whole weight of the piston in horizontal engines, a part thereof in inclined engines, and will cause the cylinder to oscillate in oscillators by being acted upon through the bush by the piston.

By securing the two ends of the rod against the heads on the outside thereof by nuts, or their equivalents for the purpose, the heads are held together at their centers as well as at their edges, and less weight of iron may be used in them and the same strength attained. The piston must ride on the rod or be sustained concentrically with the cylinder by it, either by means of the bush or some equivalent therefor, or by having the piston bored out exactly to the size of the rod, and the passage of steam from one side of the piston to the other must in some manner be prevented, and various devices may be used so long as they perform these duties. The rod may pass through the two heads and be secured by nuts or keys or flanges or collars on either one or both sides of each head. I prefer the plan shown in the drawings, whereby the heads are strengthened by being supported elsewhere than at their periphery only. One or more rods may be employed, and they may be inserted at each end into sockets in the heads, and thus be steadied in place without confining the heads of the cylinder. One or more piston-rods may be used, as convenience may dictate, and in horizontal engines with one piston-rod the latter may be, as usual, located in the center, while the sustaining-rod may be located over or under it. I prefer, however, to use two piston-rods and a single sustaining-rod.

I claim as of my own invention—

1. In combination with a piston and a cylinder, a stationary rod or rods passing through the piston, and operating substantially as specified, the combination being substantially such as described.

2. A bush or sliding block and appropriate packing, in combination with a piston, a stationary rod, and a cylinder, the whole acting substantially in the manner and for the purpose set forth.

3. In combination, a cylinder, a piston, and a stationary rod, operating in combination, as described, where the latter is likewise combined with the cylinder covers or heads, as described, whereby the rod performs the double duty of sustaining the piston and the cylinder-heads, substantially as set forth.

In testimony whereof I have hereunto subscribed my name, in the city of New York, on this 14th day of May, A. D. 1863.

JOHN BAIRD.

In presence of—
 N. CALLAN,
 NICH. CALLAN, Jr.